US010241654B2

(12) United States Patent
Meyer et al.

(10) Patent No.: US 10,241,654 B2
(45) Date of Patent: Mar. 26, 2019

(54) COMPUTER METHOD AND APPARATUS FOR AUTOMATED SCHEDULING

(71) Applicant: Dassault Systemes Americas Corp., Waltham, MA (US)

(72) Inventors: Paul R. Meyer, St. Paul, MN (US); Curtis A. Gravatt, Viroqua, WI (US); Steven Conrad, Minneapolis, MN (US)

(73) Assignee: Dassault Systemes Americas Corp., Waltham, MA (US)

( * ) Notice: Subject to any disclaimer, the term of this patent is extended or adjusted under 35 U.S.C. 154(b) by 425 days.

(21) Appl. No.: 14/137,473

(22) Filed: Dec. 20, 2013

(65) Prior Publication Data
US 2015/0177952 A1 Jun. 25, 2015

(51) Int. Cl.
*G06Q 10/06* (2012.01)
*G06Q 10/10* (2012.01)
(Continued)

(52) U.S. Cl.
CPC ........ *G06F 3/04842* (2013.01); *G06F 3/0482* (2013.01); *G06F 3/0486* (2013.01); *G06Q 10/06311* (2013.01); *G06Q 10/1093* (2013.01)

(58) Field of Classification Search
CPC .. G06Q 10/1093; G06Q 10/06; G06Q 10/109; G06Q 10/0631; G06Q 10/06312; G06Q 10/06316
See application file for complete search history.

(56) References Cited

U.S. PATENT DOCUMENTS

| 4,937,743 A | * | 6/1990 | Rassman | G06Q 10/06 |
| | | | | 705/7.22 |
| 5,113,380 A | * | 5/1992 | Levine | G04G 11/00 |
| | | | | 368/10 |

(Continued)

FOREIGN PATENT DOCUMENTS

| JP | 10138101 | 5/1998 |
| JP | 2007157124 | 6/2007 |

(Continued)

OTHER PUBLICATIONS

European Search Report issued in European Application No. EP/14197842.9, entitled "Computer Method and Apparatus for Automated Scheduling," Date of Search: May 4, 2015.

(Continued)

*Primary Examiner* — Ajay M Bhatia
*Assistant Examiner* — Phoebe X Pan
(74) *Attorney, Agent, or Firm* — Hamilton, Brook, Smith & Reynolds, P.C.

(57) ABSTRACT

A computer based scheduling and rescheduling method, apparatus and system for an electronic calendar. The electronic calendar illustrates a time progression of scheduled tasks in a horizontally or vertically oriented view of time. The electronic calendar and its graphical user interface (GUI) provide a viewing pattern for the user. Direction in the viewing pattern is synonymous with increasing/decreasing dates-times in the time progression of scheduled tasks. A scheduling-rescheduling engine schedules into the calendar user requested tasks and automatically reschedules impacted previously scheduled tasks. The scheduling-rescheduling engine also schedules user selected resources (e.g., people, robots, tools, etc.) per scheduled task.

20 Claims, 13 Drawing Sheets

(51) Int. Cl.
  *G06F 3/0482* (2013.01)
  *G06F 3/0484* (2013.01)
  *G06F 3/0486* (2013.01)

(56) References Cited

U.S. PATENT DOCUMENTS

| | | | | |
|---|---|---|---|---|
| 5,233,533 | A * | 8/1993 | Edstrom | G06Q 10/06 700/103 |
| 5,270,920 | A * | 12/1993 | Pearse | G06Q 10/06 705/7.16 |
| 5,606,695 | A * | 2/1997 | Dworzecki | G06F 9/4887 705/7.12 |
| 5,692,125 | A * | 11/1997 | Schloss | G06Q 10/06 705/7.16 |
| 5,835,898 | A * | 11/1998 | Borg | G06Q 10/06 705/7.12 |
| 6,047,260 | A * | 4/2000 | Levinson | G06Q 10/06314 705/7.15 |
| 6,381,580 | B1 * | 4/2002 | Levinson | G06Q 10/06311 705/7.13 |
| 6,445,968 | B1 * | 9/2002 | Jalla | G06Q 10/10 700/101 |
| 6,959,405 | B2 * | 10/2005 | Hite | G06Q 10/06 714/57 |
| 7,027,996 | B2 * | 4/2006 | Levinson | G06Q 10/06311 705/7.26 |
| 7,379,888 | B1 * | 5/2008 | Mahapatro | G06Q 10/06 705/7.13 |
| 7,788,598 | B2 * | 8/2010 | Bansal | G06Q 10/06 715/810 |
| 7,937,280 | B1 * | 5/2011 | Leung | G06Q 10/06 705/6 |
| 8,209,205 | B1 * | 6/2012 | McElroy | G05B 19/418 700/100 |
| 8,683,473 | B2 * | 3/2014 | Maresh | G06Q 10/0631 718/103 |
| 8,788,308 | B1 * | 7/2014 | Cox | G06Q 10/06311 705/7.16 |
| 8,965,539 | B2 * | 2/2015 | Hayes | G05B 19/41865 700/100 |
| 9,164,656 | B1 * | 10/2015 | Keller | G05B 19/41865 |
| 9,251,484 | B2 * | 2/2016 | Cantor | G06Q 10/0633 |
| 9,648,372 | B2 | 5/2017 | McDonough et al. | |
| 2002/0007297 | A1 * | 1/2002 | Clarke | G06Q 10/06 705/7.14 |
| 2002/0016729 | A1 * | 2/2002 | Breitenbach | G06Q 10/06 707/802 |
| 2003/0050818 | A1 * | 3/2003 | Maie | G06Q 10/06314 705/7.24 |
| 2005/0096957 | A1 * | 5/2005 | Bayoumi | G06Q 10/06312 705/7.22 |
| 2006/0200372 | A1 * | 9/2006 | O'Cull | G06Q 10/06 705/7.22 |
| 2006/0271399 | A1 | 11/2006 | Robson, Sr. et al. | |
| 2007/0168892 | A1 | 7/2007 | Brush et al. | |
| 2007/0192748 | A1 * | 8/2007 | Martin | G06F 3/0486 715/856 |
| 2007/0300163 | A1 * | 12/2007 | Alford | G06Q 10/109 715/751 |
| 2008/0028317 | A1 * | 1/2008 | Castelli | G06Q 10/109 715/744 |
| 2008/0215406 | A1 * | 9/2008 | Pachon | G06Q 10/06 705/7.16 |
| 2009/0106051 | A1 * | 4/2009 | Albro | G06Q 10/06 705/3 |
| 2009/0152349 | A1 | 6/2009 | Boncv et al. | |
| 2009/0234699 | A1 * | 9/2009 | Steinglass | G06Q 10/06 705/7.23 |
| 2009/0299810 | A1 * | 12/2009 | Jardine | G06Q 10/10 705/7.18 |
| 2009/0319319 | A1 * | 12/2009 | Oral | G06Q 10/109 705/7.18 |
| 2010/0070328 | A1 * | 3/2010 | Motoyama | G06Q 10/06 705/7.15 |
| 2010/0191568 | A1 * | 7/2010 | Kashyap | G06Q 10/06 705/7.15 |
| 2010/0257015 | A1 * | 10/2010 | Molander | G06Q 10/06 705/7.21 |
| 2011/0035244 | A1 * | 2/2011 | Leary | G06Q 10/00 705/7.13 |
| 2011/0035749 | A1 * | 2/2011 | Krishnakumar | G06F 9/4881 718/102 |
| 2011/0060623 | A1 * | 3/2011 | Neureuter | G06F 3/04812 705/7.16 |
| 2011/0239158 | A1 * | 9/2011 | Barraclough | G06Q 10/109 715/808 |
| 2011/0307896 | A1 * | 12/2011 | Kruckenberg | G06F 9/4887 718/102 |
| 2011/0314375 | A1 * | 12/2011 | Zaika | G06F 3/0482 715/708 |
| 2012/0041793 | A1 * | 2/2012 | Farina | G06Q 10/02 705/5 |
| 2012/0060166 | A1 * | 3/2012 | Jardine | G06Q 10/109 718/104 |
| 2012/0278408 | A1 * | 11/2012 | Seferian | G06Q 10/1095 709/206 |
| 2013/0006689 | A1 * | 1/2013 | Kinnear | G06Q 10/06 705/7.16 |
| 2013/0047162 | A1 * | 2/2013 | Stefanov | G06F 9/5033 718/102 |
| 2013/0110739 | A1 * | 5/2013 | Hill | G06Q 10/083 705/333 |
| 2013/0145243 | A1 | 6/2013 | Huang et al. | |
| 2013/0246110 | A1 * | 9/2013 | Nakhayi Ashtiani | G06Q 30/0207 705/7.13 |
| 2013/0268886 | A1 * | 10/2013 | Sureshkumar | G06Q 10/025 715/810 |
| 2013/0339902 | A1 * | 12/2013 | Katzman | G06F 3/0482 715/810 |
| 2013/0339969 | A1 | 12/2013 | Koski et al. | |
| 2014/0032256 | A1 * | 1/2014 | Hess | G06Q 10/06 705/7.24 |
| 2014/0082536 | A1 * | 3/2014 | Costa | G06F 3/0488 715/765 |
| 2014/0282199 | A1 * | 9/2014 | Basu | G06F 3/0484 715/772 |
| 2015/0058053 | A1 * | 2/2015 | De | G06Q 10/06311 705/7.13 |
| 2015/0113420 | A1 * | 4/2015 | Itani | G06Q 10/109 715/739 |
| 2015/0113447 | A1 * | 4/2015 | Lineberger | H04W 4/21 715/758 |
| 2015/0127403 | A1 * | 5/2015 | Petty | G06F 3/0481 705/7.18 |
| 2015/0135085 | A1 * | 5/2015 | Shoham | G06F 3/0482 715/739 |
| 2015/0135184 | A1 * | 5/2015 | Cho | G06F 9/4881 718/103 |
| 2015/0372829 | A1 * | 12/2015 | Joshi | G06F 3/04847 709/206 |
| 2016/0140482 | A1 * | 5/2016 | Ertl | G06Q 10/063118 705/7.17 |
| 2016/0379167 | A1 | 12/2016 | Raman | |

FOREIGN PATENT DOCUMENTS

| | | |
|---|---|---|
| JP | 2008299762 | 11/2008 |
| WO | WO 01/75637 | 10/2001 |
| WO | WO 2008/061833 | 5/2008 |

OTHER PUBLICATIONS

Drag and Drop, From Wikipedia, the free encyclopedia; 6 pages; downloaded on May 24, 2016; XP055274964.

How to Drag and Drop Emails in Outlook; 5 pages; downloaded May 24, 2016; XP055274974.

(56) References Cited

OTHER PUBLICATIONS

IBM Notes and Domino wiki: Lotus Notes: Using the Drag and Drop Feature in IBM Notes; 4 pages; downloaded May 24, 2016; XP 055274968.

* cited by examiner

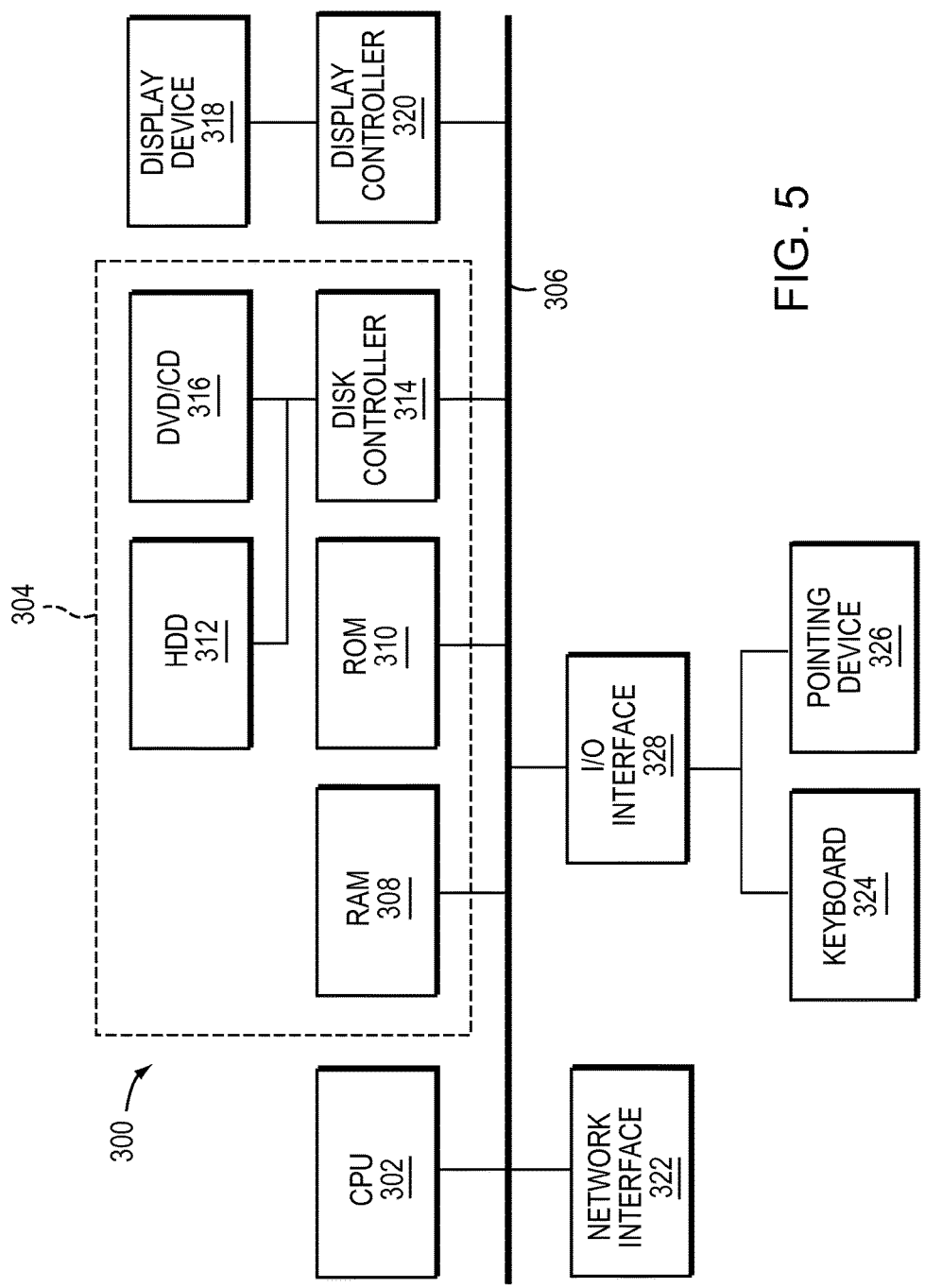

COMPUTER METHOD AND APPARATUS FOR AUTOMATED SCHEDULING

BACKGROUND OF THE INVENTION

Currently, aerospace manufacturers are forced to view, schedule, and manage tasks by using a combination of paper and short handwritten notes (e.g. sticky notes). This method of schedule display is known as a bar chart. A series of tasks is laid out on a horizontal "bar" and people's names are assigned to the bar or individual tasks.

This paper-based method of viewing, scheduling, and managing shop floor tasks has the following limitations.

An external system may be used to initiate changes to task schedules and changes to allotment of resources. These changes are not reflected in the paper-based method until the task management information is manually updated.

The manual configuration of data display in the paper-based method is prone to error. The error may be in the manual notation and/or the error may be in the interpretation by the reader where the displayed data is often short and abbreviated.

The manual configuration of data display in the paper-based method is time consuming and inefficient.

Critical data is not displayed in a timely manner in the paper-based method and critical data is only available in a single location.

The manual configuration of data display in the paper-based method does not prevent logical errors such as scheduling a task for a date/time in the past or a time that is not available due to shop schedule. In a like manner, unavailable resources may be assigned to a task.

Furthermore, inserting a new task into a time slot currently used by another task does not automatically reschedule affected tasks in the paper-based method. The manual rescheduling is prone to logical errors (similar to the above), is time consuming and inefficient (as previously mentioned).

SUMMARY OF THE INVENTION

The present invention addresses the foregoing problems in the art.

Embodiments in the present invention provide the following advantages and features.

Scheduled tasks are automatically computer displayed in a horizontal position when the tasks are created or when the schedule is updated by an external system.

Tasks may be viewed or managed in any area using desktop or tablet devices.

Tasks are easily rescheduled by a GUI dragging of the task to the desired displayed time slot.

When a task is dropped into a displayed time slot, a rescheduler (i.e., a scheduling engine employing a linear rescheduling algorithm) stacks the tasks horizontally based on the working time set in the work center calendar and the task duration set in each task.

Tasks cannot accidentally be scheduled to a time slot in the past or a time slot that does not fit within the working schedule.

Scheduled tasks affected by the scheduling of another task are automatically rescheduled. When task dependencies and current schedule will cause another scheduled task to be started late, this constraint is shown to the user to resolve.

Unavailable resources may not be assigned to a task time slot.

Accordingly embodiments provide:
(i) Reduced time to manage and view data,
(ii) Significantly improved data integrity and availability, and
(iii) Significantly improved project coordination and management.

Embodiments provide a graphical user interface where tasks are easily rescheduled by dragging the displayed task to the desired time slot. In response, the rescheduling engine automatically reschedules now-downstream tasks as necessary.

Available resources (e.g., people, machinery, equipment, tools, etc.) may be assigned to a scheduled task by dragging an indication or representation of the person to the displayed task. Unavailable resources may not be assigned to a task time slot.

A scheduling method embodying the present invention comprises a digital processor providing one or more electronic calendars that display scheduled tasks in a time progression and in time order of respective task start date/times. The displayed time progression may be along a horizontally oriented viewing pattern or along a vertically oriented viewing pattern. Direction in the viewing pattern is synonymous with increase/decrease of date/time in the time progression.

In response to user interaction with an electronic calendar as displayed, the computer-implemented method automatically schedules a user requested unscheduled task and reschedules any affected previously scheduled tasks in the calendar. Consequently, the calendar maintains a logically correct schedule of tasks including the user requested task and previously scheduled tasks.

The electronic calendar displays the scheduled tasks in time order of respective task start dates/times such that increasing date and time of the time progression is illustrated in a same direction as increasing date and time of viewing pattern of the electronic calendar.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a block diagram of a computer system.

DETAILED DESCRIPTION OF THE INVENTION

Figure 1:
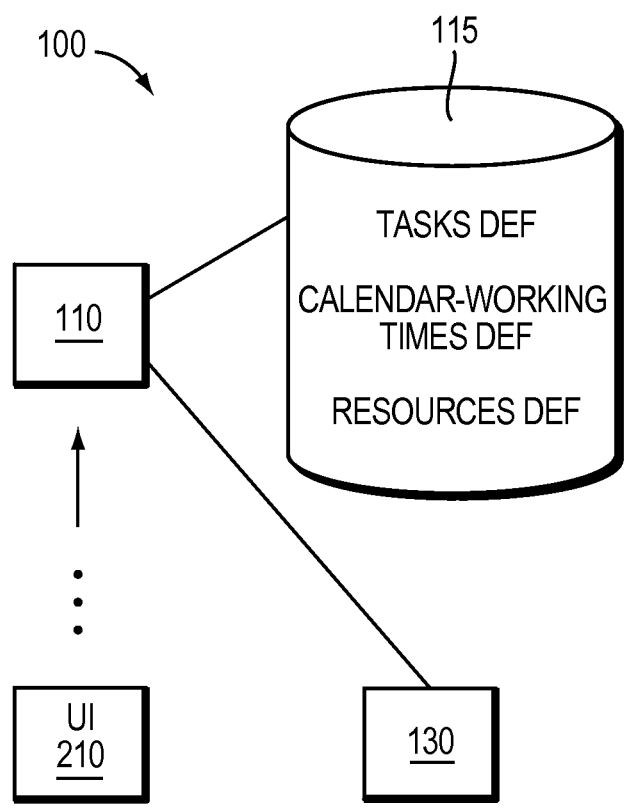
FIG. 1 is a schematic view of an embodiment.

A description of example embodiments of the invention follows.

Illustrated in FIGS. 1-6 is an automatic visual scheduling tool 100 embodying the principles of the present invention. The tool 100 provides a work center calendar 110 (i.e. electronic calendar) with a horizontally oriented time line view of work tasks. The work tasks may be for example, shop order operations and production related tasks on a manufacturing shop floor, or in other fields, tasks scheduled and assigned to people, robots, equipment, machinery, tools or other resources, and the like. As will be made clear below, the time line of work center calendar 110 illustrates dates and times progressing into the future from left to right. The work center calendar 110 represents scheduled work tasks arranged by respective start time along the time line. The horizontal display of work tasks in the work center calendar 110 provides for easy perception of upcoming work and/or time order of work.

The tool 100 employs a drag and drop graphical user interface 210 and a scheduling engine 130. The work center calendar 110 is responsive to user requests and creates and maintains a centralized master schedule (may be one or more schedule) of multiple work tasks. The scheduling engine (including a rescheduler component) 130 realigns the scheduled and displayed work tasks based on user input and task duration. A database 115 supports the operations and functioning of the work center calendar 110.

In one embodiment, the database 115 stores for each work task: (i) a representation, and (ii) time duration information. The representation may be formed of a description, a name or title of the task, and/or an icon (symbol, thumbnail image or other visual indicator). The database 115 stores for the calendar 110 a respective working time per scheduled work task. The database 115 also stores for the calendar 110 which weeks of the year and days of a month are not valid (for example, due to holidays, inventory closings, etc.), as well as days of the week and hours per day that are valid work shifts (working times) and hence possible candidates to be assigned to or scheduled for work tasks and/or resources. In this way, database 115 stores work task definitions and calendar work time definitions and schedule assignments of work tasks and resources.

In particular, in embodiments, scheduled tasks are displayed in a horizontal date-time based format. Preferably scheduled tasks are automatically displayed in a horizontal position when the tasks are created or when the schedule is updated by an external system. Tasks may be viewed or managed in any display area (e.g., windows, network tab, etc.) using desktop or tablet devices.

A user is able to reschedule a scheduled task or schedule a non-scheduled task by dragging a representation of the subject task to a valid date-time position. Non-valid date-time positions include any date-time in the past or any date-time that does not fit within a predetermined work calendar date-time range(s).

When a user drops a subject task into a time slot, scheduling engine 130 utilizes a linear rescheduling algorithm to stack the tasks horizontally based on the working time set in the work center calendar and the task duration set in each task.

Thus all tasks impacted by the scheduling of a task are automatically rescheduled linearly (by scheduling engine 130) based on the duration of each task and the availability of a date-time that fits within a predetermined work calendar date-time range(s).

The user cannot accidentally schedule a task to a time slot in the past or to a time slot that does not fit within the working schedule.

A user is able to assign valid resources to assist in the execution of the task that is not scheduled for a date-time in the past. A resource is not a valid resource when that resource is already scheduled to assist on another task during a date-time range that fits within the schedule of the target task.

Figure 2A:
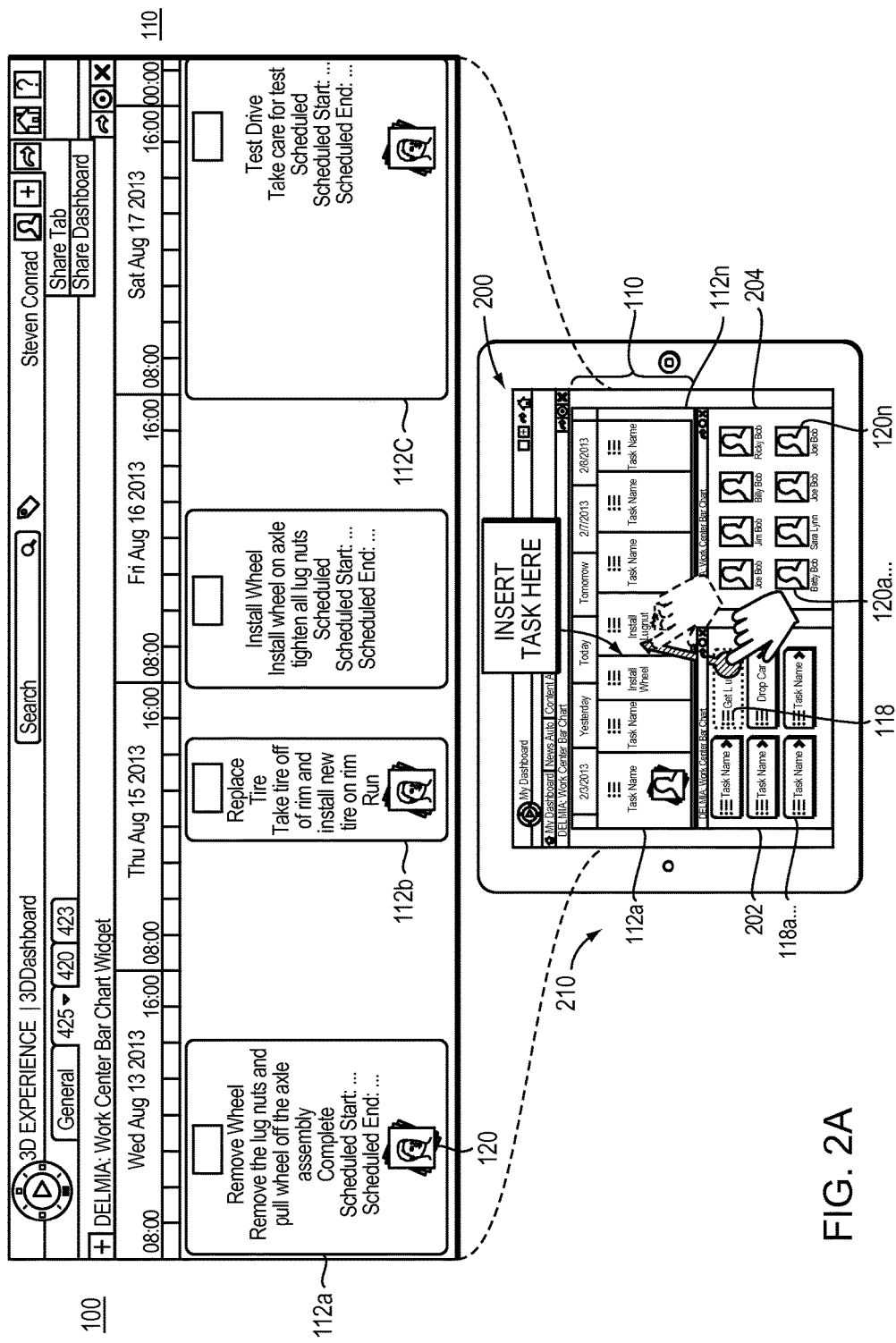
FIGS. 2A-2D are schematic illustrations of the graphical user interface scheduling tasks in embodiments.

Illustrated in FIGS. 2A-4C is a non-limiting example embodiment of a work center calendar 110 and corresponding graphical user interface 210 (GUI). Shown in FIG. 2A is a main view 200 (part of GUI 210) formed of work center calendar 110, a user scrollable area 202 showing representations of un-scheduled tasks 118, and a user searchable area 204 having indications of various available resources (e.g. people, robots, tools, other equipment, machinery, etc.) 120a, . . . 120n (generally 120). Generally, the work center calendar 110 is arranged by year, month, week, day, and hour hierarchy of time units. The user interface 210 enables the user to view calendar 110 at various levels of time granularity (e.g., hours of a day versus days of a week) by zoom in/out functions and at different periods of time (ranges of days in a certain week of a certain month and year for example) by forward/reverse navigation and search functions. Common graphical user interface technology operation and implementation of these functions are utilized.

In the illustrated example, tool 100 displays calendar 110 having a range of days arranged from left to right hand sides of the screen view 200 progressing into the future. Immediate days prior to (preceding) the displayed days are available on a continuum to the left side of the screen view 200 by touch screen scrolling or the like of GUI 210. Likewise, immediate succeeding (future) days to the displayed days are accessible on a continuum to the right hand side of the screen view 200 by touch screen scrolling of GUI 210. Such a horizontal display layout and viewing pattern (e.g., oriented left to right synonymous with progression of time) allows the user to visualize the order of scheduled work tasks 112 per day in a week, or per hour in a day or other time scale. This orientation and presentation of calendar 110 data and scheduled tasks 112 provides easy perception of time order and sense of scheduled and unscheduled time at a glance.

Figure 2B:
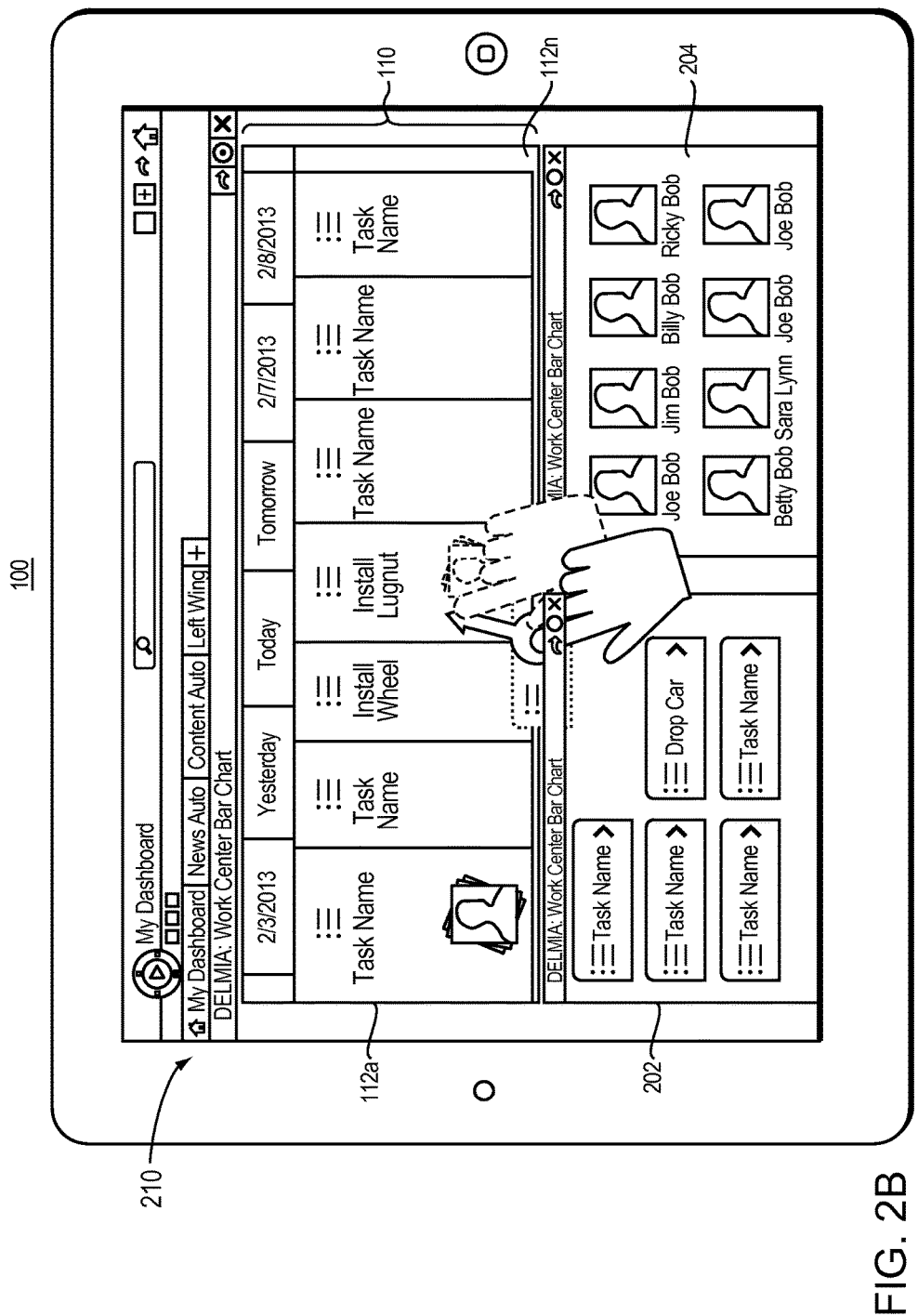
Figure 2C:
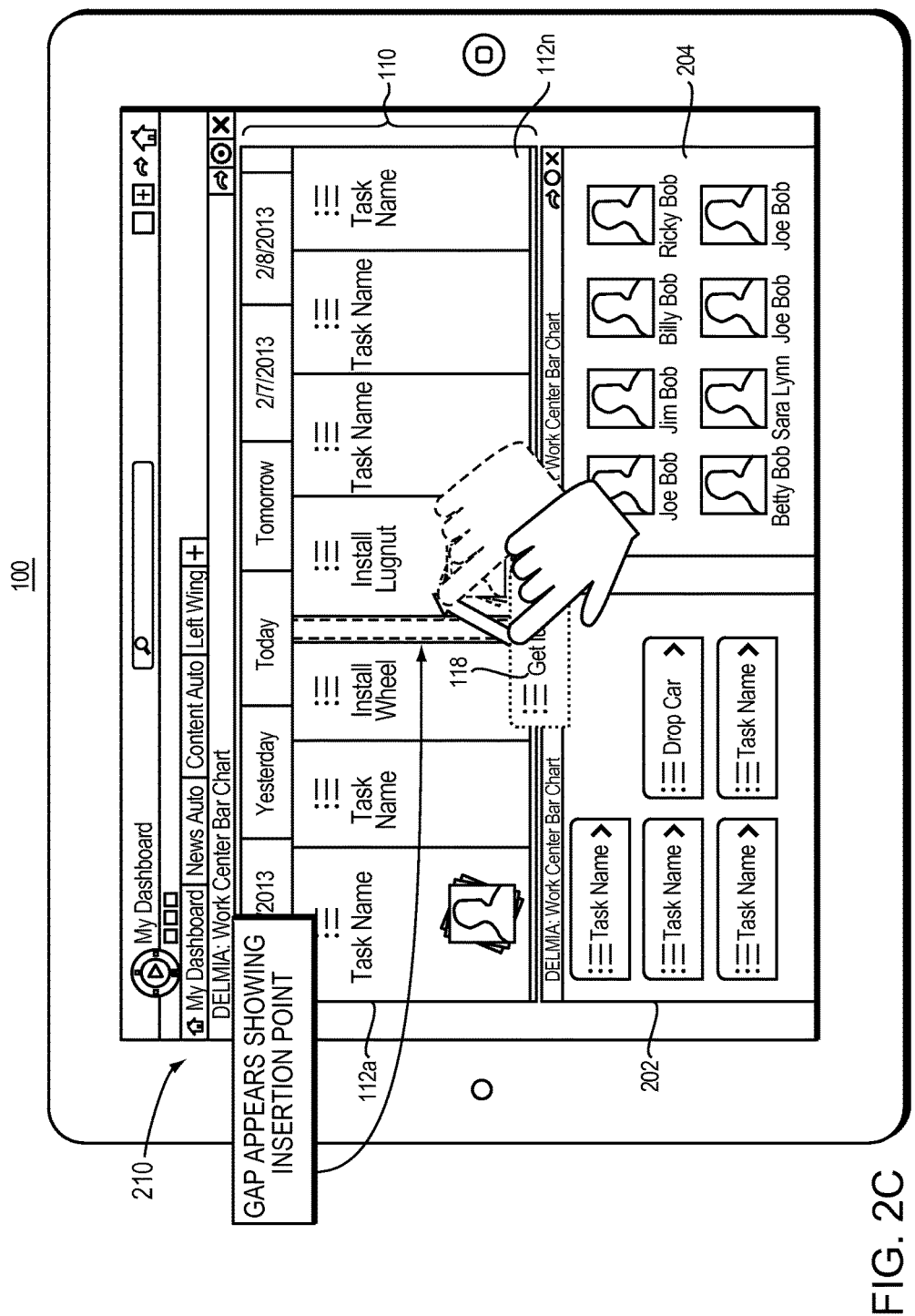

In some embodiments, upon loading the tool 110, a default time range is displayed. The tool 100 enables the user to optionally change the displayed time range. Once the user has set the electronic calendar 110 view at a desired time range, the user schedules an unscheduled work task 118 as shown in FIGS. 2A-2D. The user selects a desired work task 118 (its representation) from the area 202 of unscheduled tasks by cursor control device highlight select or by touching and maintaining contact pressure on the selected work task 118. While maintaining contact pressure (or cursor control device selection/relative operation), the user moves (drags) the selected work task representation 118 from the unscheduled tasks area 202 to the calendar 110 as illustrated in FIG. 2A and FIG. 2B. In particular, the user drags and drops the selected work task representation 118 at the desired date and time among scheduled tasks 112a . . . n (112 generally) in electronic calendar 110 as illustrated in FIG. 2C. Common drag and drop technology is employed.

Figure 2D:
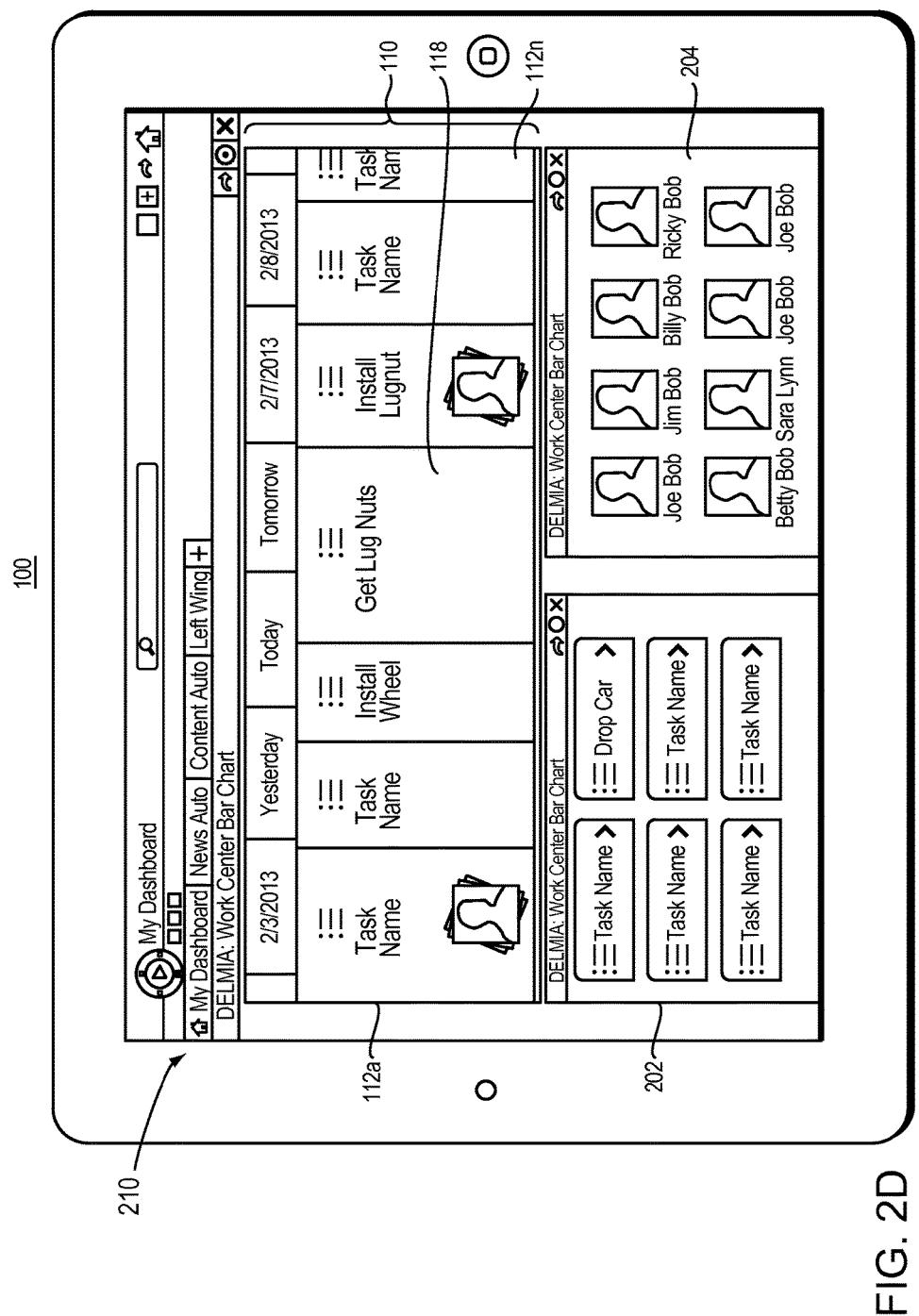

In response, scheduling engine 130 (shown in FIG. 1) schedules the user-selected work task 118 to the time slot at the user selected date/time and automatically reschedules now down-stream (previously scheduled) work tasks 112. To accomplish this, scheduling engine 130 (i) determines validity of the user selected date/time (i.e., validates that the user selected date/time is not in the past and is within working times defined in the database 115 shown in FIG. 1) and (ii) applies a linear rescheduling algorithm. As a result, tool 100 displays the user-selected work task representation 118 in the calendar schedule beginning at the user selected date/time and having a duration as defined by the work task 118. FIG. 2D is illustrative. Tool 100 also displays the now downstream work tasks 112 (representations thereof) at adjusted or rescheduled start times (date/times) in the work center calendar 110 accordingly. Scheduling engine 130 stores the updated calendar schedule (work tasks 112 assignments) in database 115 accordingly.

In a similar manner, if the user drags and drops the selected work task 118 onto a scheduled work task 112 in the electronic calendar 110 (i.e., onto an already occupied time slot having been previously assigned to the scheduled work task 112), scheduling engine 130 recognizes that the corresponding time slot is occupied or taken. Scheduling engine 130 (i) reschedules the subject scheduled work task 112 from the conflicted time slot, (ii) schedules the user selected work task 118 at the subject time slot, and (iii) reschedules the down stream work tasks 112. Scheduling engine 130 stores the updated calendar schedule (date/time slot assignments to work tasks 112a . . . n) in database 115 accordingly.

Figure 3A:
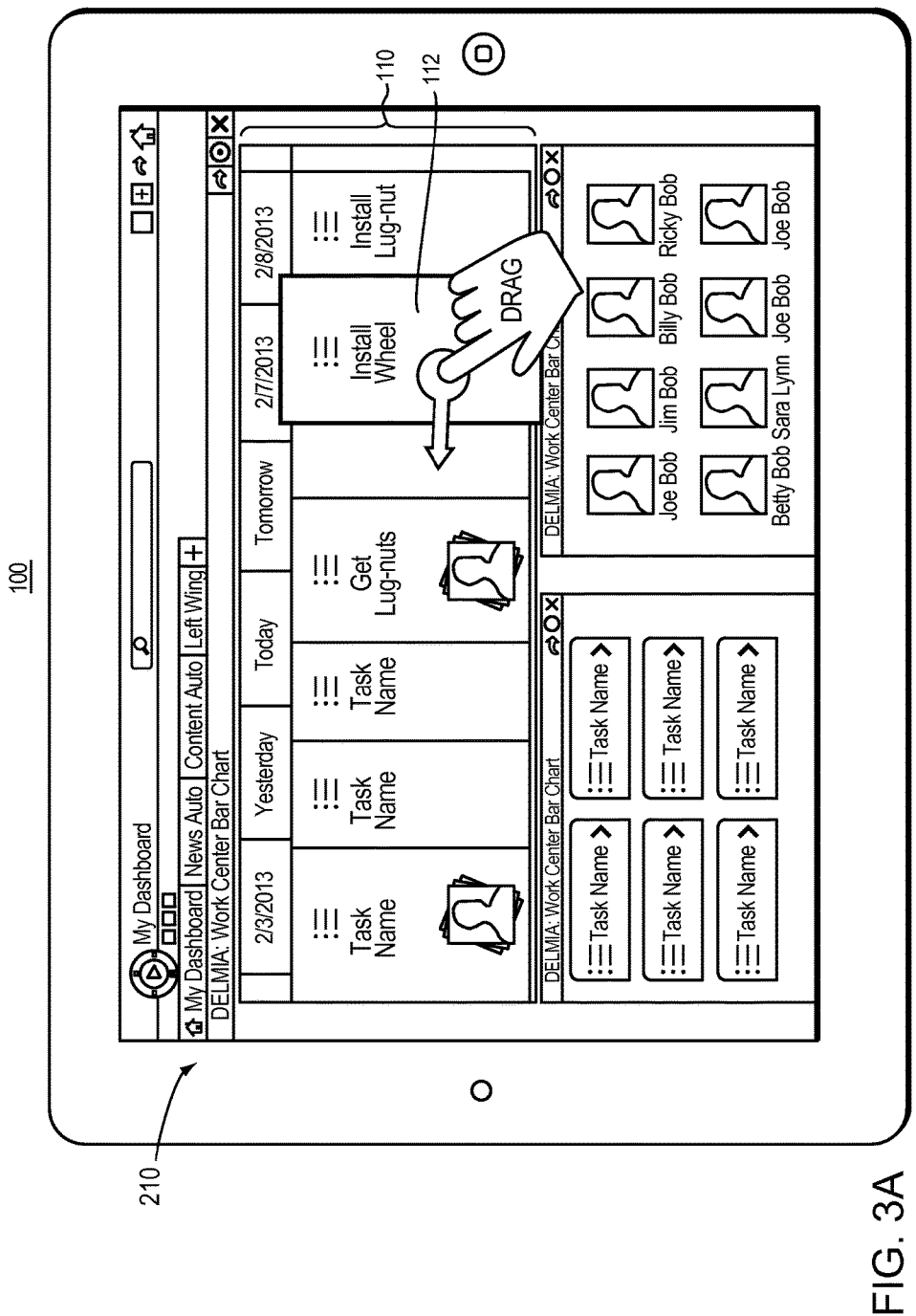
FIGS. 3A-3C are schematic illustrations of the graphical user interface rescheduling tasks in embodiments.
Figure 3B:
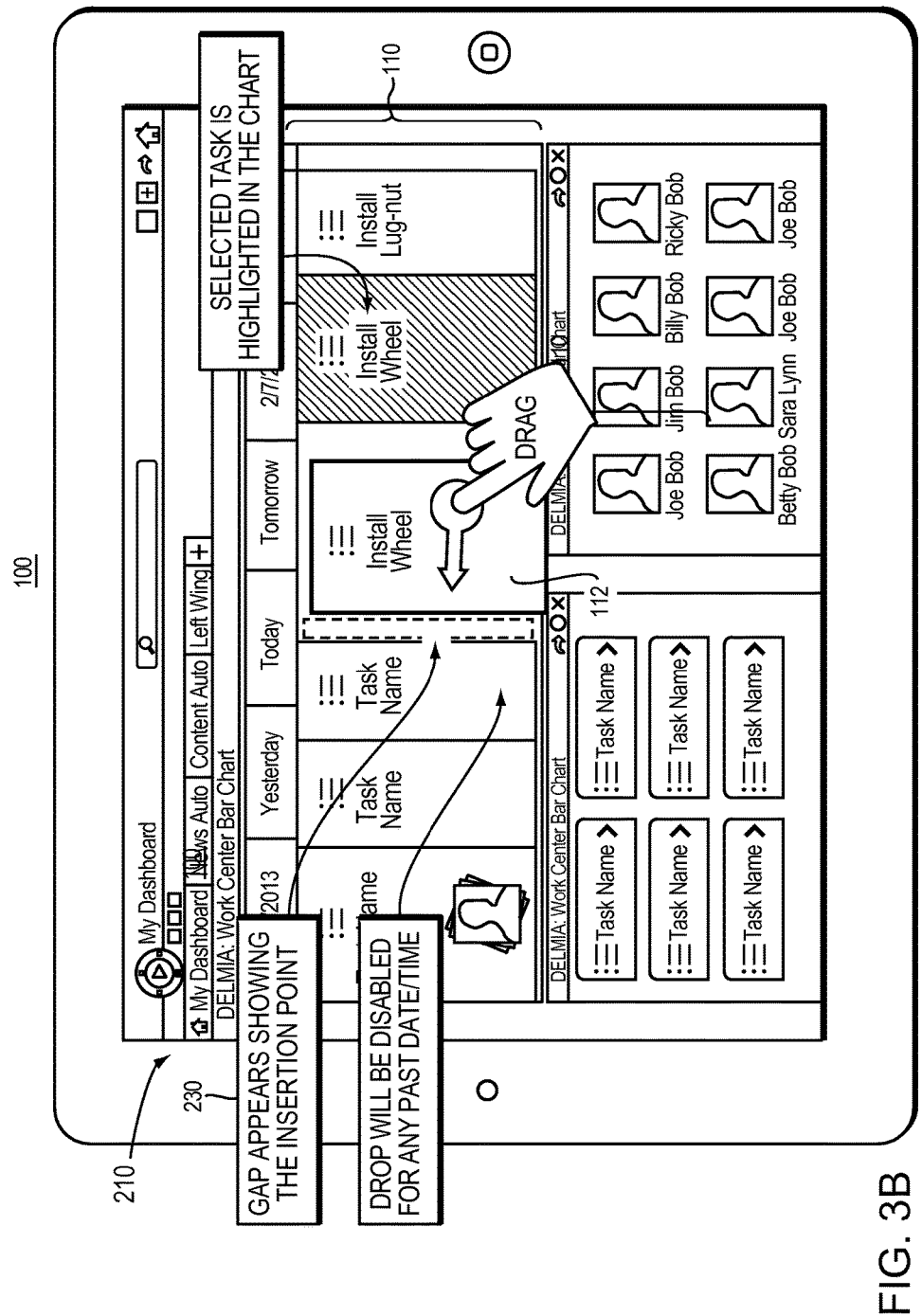
Figure 3C:
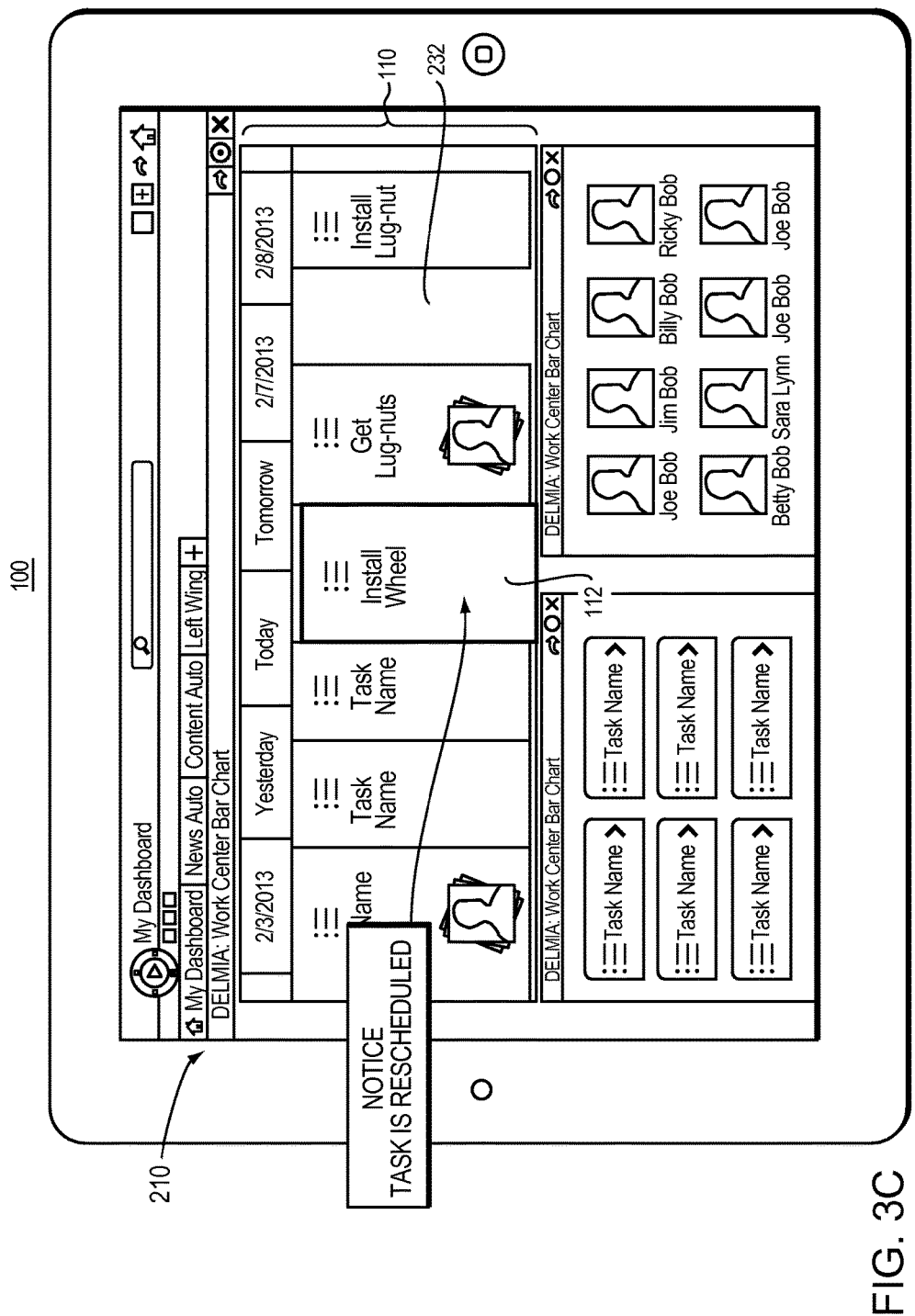

Subsequent to scheduling one or more tasks 118 in calendar 110 as in FIGS. 2A-2D, the user may reschedule a scheduled work task 112 as illustrated in FIGS. 3A-3C. Using touch to select and drag technology, the user selects a desired scheduled work task 112 currently at (assigned to) one time slot 232 (shown in FIG. 3C) in electronic calendar 110 and moves (drags) said scheduled work task 112 to a desired time slot 230 (shown in FIG. 3B). In response, scheduling engine 130 reschedules the impacted scheduled work tasks 112 in calendar 110 based on working times set in calendar 110 definitions in database 115 and respective time durations of work tasks defined and stored in database 115. Preferably scheduling engine 130 includes a rescheduler that applies a linear rescheduling algorithm detailed below. Scheduling engine 130 stores the updated calendar schedule in database 115. Tool 100 displays the resulting calendar 110 schedule in GUI 210 as illustrated in FIG. 3C.

Scheduling engine 130 does not allow a work task to be scheduled or rescheduled to a time slot in the past or to a time slot that does not fit within the working times defined for calendar 110 in database 115.

Figure 4A:
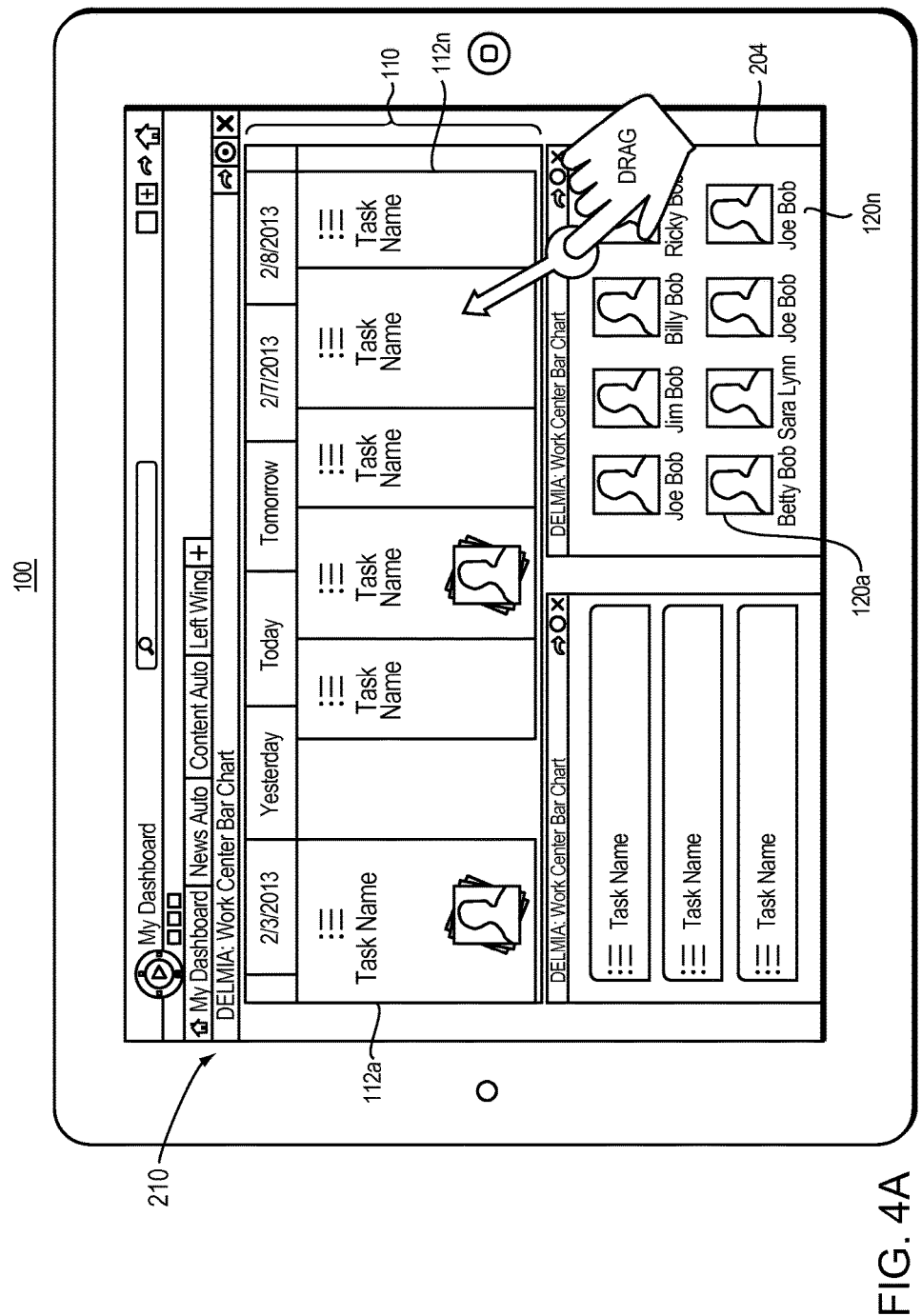
FIGS. 4A-4C are schematic illustrations of the graphical user interface assigning a person or resource to a scheduled task.
Figure 4B:
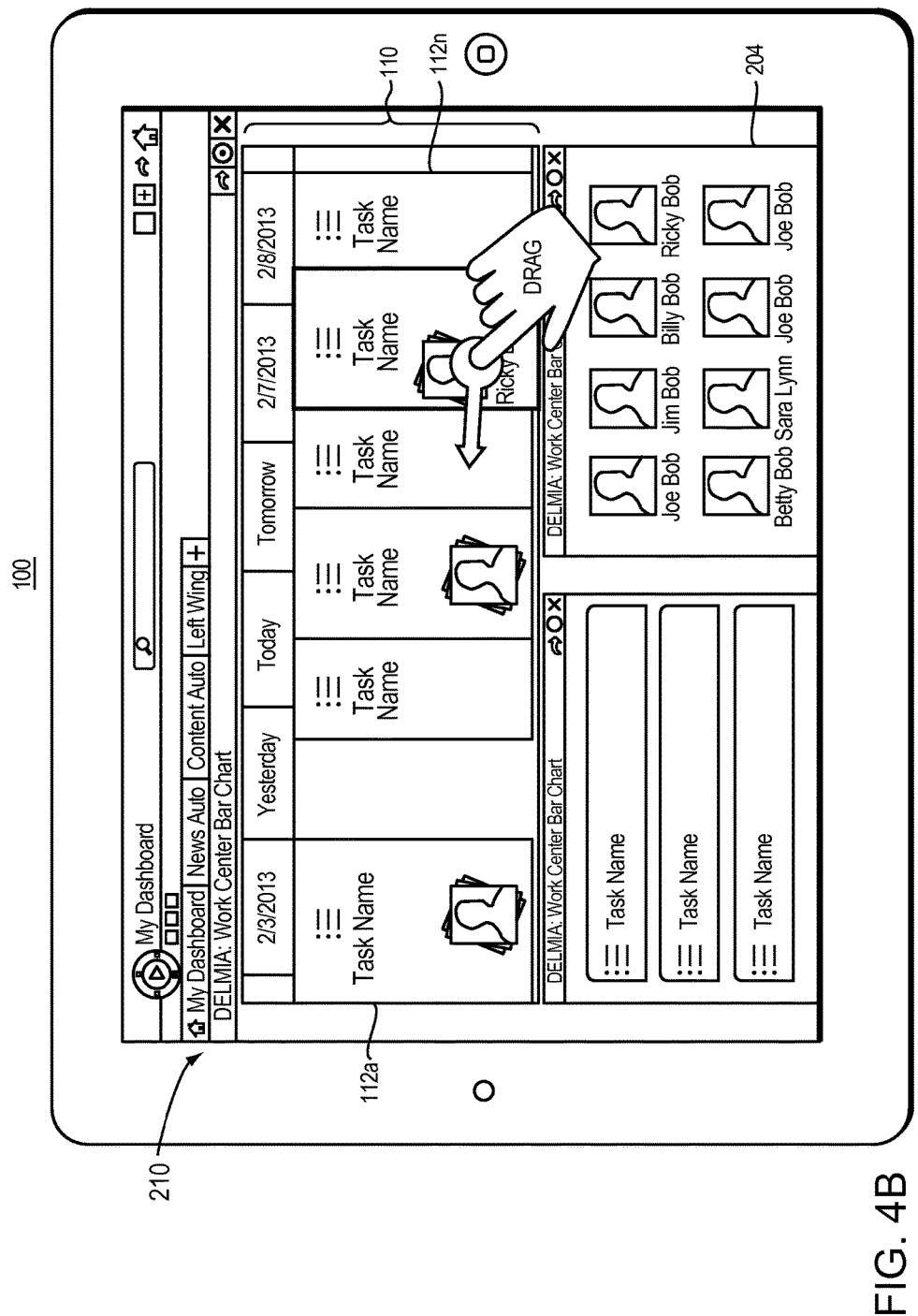
Figure 4C:
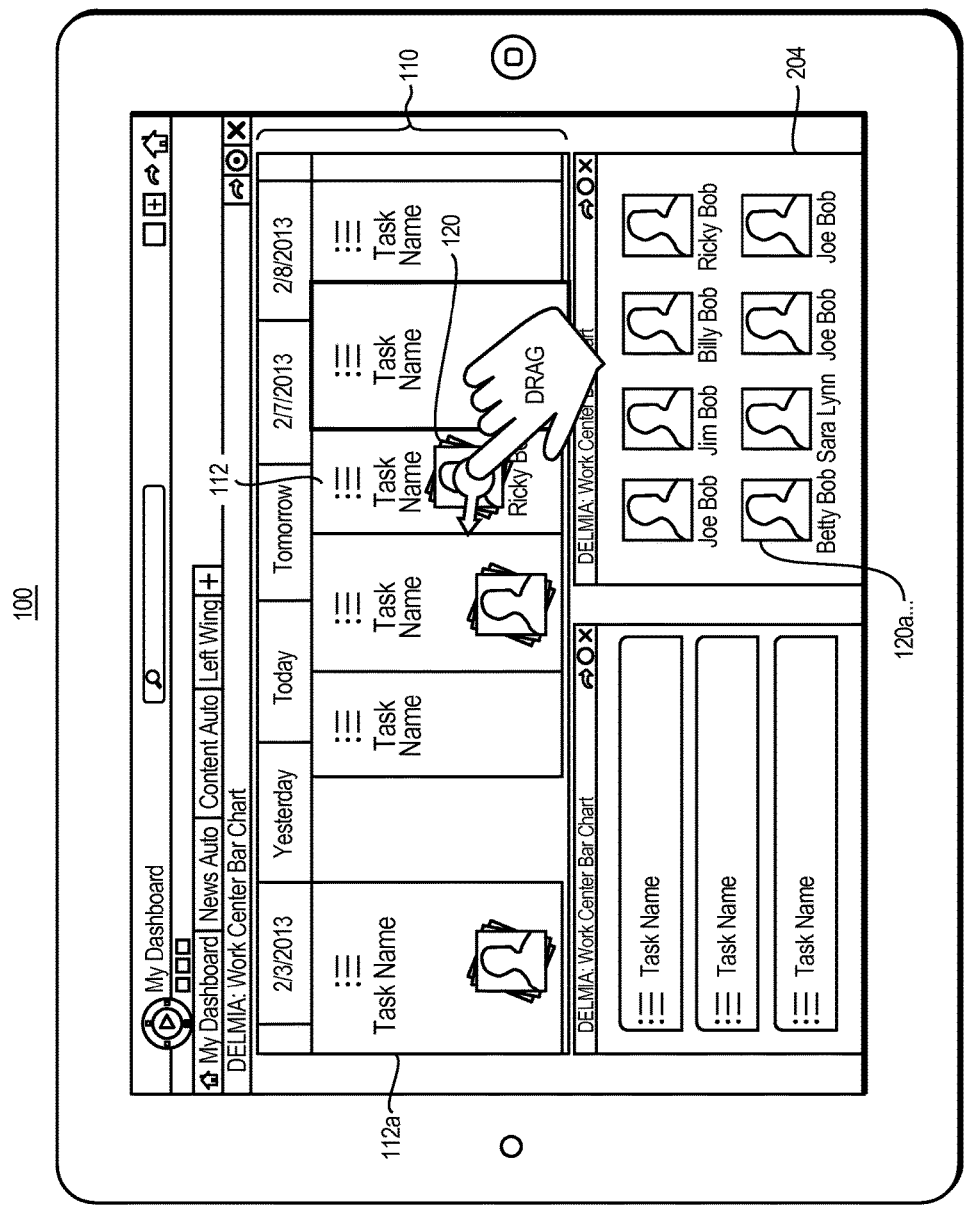

FIGS. 4A-4C illustrate how, through GUI 210, the user may assign available resources (e.g., people, robots, tools, equipment, etc.) 120a . . . n to scheduled work tasks 112a . . . n in electronic calendar 110 as illustrated in FIGS. 4A-4C. Using drag and drop GUI techniques, GUI 210 allows the user to select a desired resource 120 from area 204 of resources and to move (drag) a copy of the representation of the user-selected resource 120 out of area 204 and into the calendar 110 area to a desired scheduled work task 112.

Scheduling engine 130 is responsive by determining from database 115 availability of the user-selected resource 120. The respective schedules of assigned times and valid available work times of resources 120a . . . n may be stored in database 115 similar to that of work tasks 112a . . . n and 118a . . . n. Thus, scheduling engine 130 not only determines that user selected resource 120 has available time for the corresponding time slots (start date/time and duration) of the target scheduled work task 112, but that the corresponding time slot is within valid work times of the user selected resource 120. In this way, tool 100 prevents unavailable resources 120 from being assigned to work tasks 112 and corresponding time slots. After scheduling engine 130 affirmatively determines availability of the user selected resource 120, scheduling engine 130 assigns the subject selected work task 112 and corresponding time slot to the resource 120. In turn, scheduling engine 130 updates the calendar schedule and resource work task/time slot assignments in database 115. Tool 100/GUI 210 display the resulting work center calendar 110 as shown in FIG. 4C.

Turning now to the scheduling/rescheduling engine 130, implementation in one-embodiment is as follows.

After the user drags a particular task (referred to below as 'currentTask'), the scheduling engine 130 executes the following algorithm. When referring to start and end times herein, a time/date combination is intended—both the date and time of day are taken into consideration.

1) Recalculate start time based on drag position of the currentTask. Scheduling engine 130 is configured to 'snap' the task to a configurable increment (i.e., closest hour, closest day, closest 15 min period, etc.).

2) Determine if the new start time is in the middle of an existing task and if so, move the start time to the end of that task
   a. Load start and end times of all tasks and order chronologically
   b. Sort through each task. If currentTask.startTime>existingTask.startTime AND currentTask.startTime<existingTask.endTime, then set currentTask.startTime=existingTask.endTime 3) Recalculate end time based on new start time and task duration. Adjust for work day length.

4) Move following tasks—if a task is dragged so that its end date crosses into another task, the start date of the second task must be adjusted. Note, this function is called recursively—when the second task is moved, it may force a third task to be moved, etc.
   a. Load start and end times of all tasks and order chronologically. Locate the first task whose start time is greater than currentTask.startTime
   b. Loop over all tasks remaining in the list. For each existingTask in this list, If existingTask.startTime<currentTask.endTime AND existingTask.startTime>currentTask.startTime
      i. Calculate duration of existingTask
      ii. Set existingTask.startTime=currentTask.endTime
      iii. Set existingTask.endTime based on duration
      iv. Adjust for work day length
      v. Position existingTask on the horizontal display
      vi. Recursively call moveFollowingTasks for existingTask (which now becomes currentTask in the recursive call)

5) Move overwritten tasks—if a task is dragged so that it completely covers another task, the task that it covers is moved to follow currentTask
   a. Load start and end times of all tasks and order chronologically. Loop over all tasks (existingTask)
   b. If currentTask.startTime<existingTask.startTime AND currentTask.endTime>existingTask.endTime
      i. Calculate duration of existingTask
      ii. Set existingTask.startTime=currentTask.endTime
      iii. Set existingTask.endTime based on duration
      iv. Adjust for work day length
      v. Position existingTask on the horizontal display 6) Reorder tasks—once schedule engine 130 has moved all of the tasks around, the engine needs to re-order data based on how the task start/end times have changed
   a. Find task with earliest start time. Position at the beginning of the list.
   b. Recursively call reorderTasks and pass in the task that was placed at the beginning of the list. This will set the second task and then recursively call to find the third task, etc.

The work center calendar 110 and/or the scheduling engine 130 takes the following into consideration:

In the horizontal schedule display, embodiments implement zoom functionality. This allows the user to 'zoom' the display of electronic calendar 110 to see longer or shorter time periods. Tool 100 algorithms re-calculate the position and sizing of task elements (scheduled work tasks 112) based on the zoom level of the display.

The schedule display also takes into account different work schedules. The calendar 110 schedules can be configured for 8 hour, 16 hour, or 24 hour work days, for example. When moving scheduled work tasks 112, if a task 112 goes past the end of a work day, the end time is adjusted so that the subject task 112 will be completed the following valid work day. For example, if a shop opens at 8:00 AM and closes at 4:00 PM, and a 6 hour task 112 is scheduled to begin at 3:00 PM, the scheduling engine 130 automatically sets the end time of the task 112 to 12:00 PM on the following valid work day.

In another embodiment, there may be a work center calendar 110 per room. For example, a certain factory room has a respective work center calendar 110. Tasks 112, 118 and resources 120 are scheduled on this calendar using the techniques and features described above. In addition, tasks 112, 118 may be transferred from a calendar 110 of one factory room to the respective calendar 110 of a different factory room. Scheduling engine 130 employs the above described algorithms and techniques to validly schedule/reschedule tasks 112, 118 and impacted prior scheduled tasks 112 across plural work center calendars 110 (as well as within a subject calendar 110).

FIG. 5 is a schematic block diagram of an exemplary computer-aided design station 300, which may also be referred to herein as a computer system. As used herein, the terms "computer-aided design station" and "computer system" refer generally to any suitable computing device that may be used to perform the processes described above and/or any additional processes that may be related to those described above.

In an exemplary embodiment, the computer-aided design station 300 includes one or more processors 302 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a non-transitory computer-readable medium, such as a memory area 304 that is operably and/or communicatively coupled to the processor 302 by a system bus 306. A "memory area," as used herein, refers generally to any means of storing program code and instructions executable by one or more processors to aid in automatically scheduling and rescheduling using an electronic calendar tool 100. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-erasable programmable read-only memory (EEPROM). Any other suitable magnetic, optical, and/or semiconductor memory, such as a hard-disk drive (HDD) 312, by itself or in combination with other forms of memory, may be included in the memory area 304. HDD 312 may also be coupled to a disk controller 314 for use in transmitting and receiving messages to and from processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer-aided design station 300 also includes a display device 318 that is coupled, such as operably coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only and, thus, are not intended to limit in any way the definition and/or meaning of the term "display device."

In addition, the computer-aided design station 300 includes a network interface 322 for use in communicating with a network (not shown in FIG. 5). Moreover, the computer-aided design station 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

The drag and drop techniques for user interface 210 may be implemented by a touch screen, by a cursor control device or other I/O technology common in the art.

Figure 6:
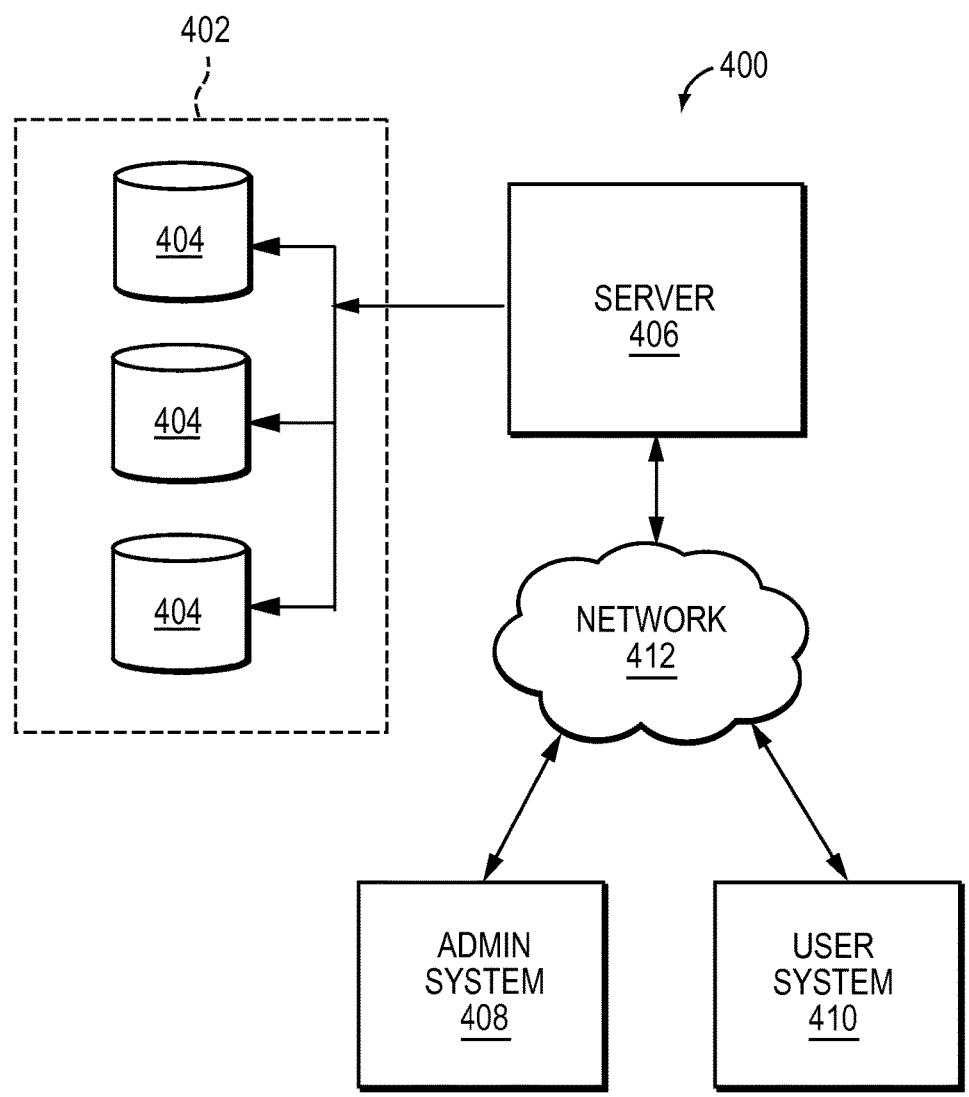
FIG. 6 is a schematic view of a computer network formed of the computer system of FIG. 5.

FIG. 6 is a schematic block diagram of an exemplary system 400 for use in computer-aided design of a modeled object, such as the processes described above and/or additional processes that may be related to those described above. In an exemplary embodiment, a memory area 402 includes one or more storage devices 404 for use in storing work center calendar 110 data, such as scheduled tasks 112 data, scheduled resources 120 data, tasks definitions, resources definitions and calendar working times definitions and/or unscheduled tasks 118 data. In some embodiments, the memory area 402 is coupled to a server 406, which is in turn coupled to an administrator system 408 and/or a user system 410 via a network 412. The storage devices 404 may be embodied as one or more databases, may be located at a single or at multiple geographical sites, or may be integrated with the server 406.

As can be appreciated, the network 412 can be a public network, such as the Internet, or a private network such as an LAN or WAN network, or any combination thereof and can also include PSTN or ISDN sub-networks. The network 412 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 412 is merely exemplary and in no way limits the scope of the present advancements.

As one of ordinary skill in the art would recognize, the administrator system 408 and/or the user system 410 can be a computer-aided design station such as the one described above with reference to FIG. 5, or any other computing system that is known. Moreover, it should be understood that the administrator system 408 and/or the user system 410 are configured to perform the processes described above and/or any additional processes that may be related to those described above.

The server 406 stores the computer-readable instructions to execute the processes described above and provides these instructions via the network 412 to the administrator system 408 and/or the user system 410. Moreover, the server 406 can also provide data from the memory area 402 as needed to the administrator system 408 and the user system 410. As such, FIG. 6 includes implementations of the system 400 via cloud computing, distributed computing and the like.

Exemplary embodiments of systems, methods, apparatus, computer program products, and computer-readable storage media for use in computer-aided design of a modeled object are described above in detail. The systems, methods, apparatus, computer program products, and computer-readable storage media are not limited to the specific embodiments described herein but, rather, operations of the methods, program products and/or storage media, as well as components of the system and/or apparatus, may be utilized independently and separately from other operations and/or components described herein. Further, the described operations and/or components may also be defined in, or used in combination with, other systems, methods, apparatus, program products and/or storage media, and are not limited to practice with only the systems, methods, apparatus, program products and storage media as described herein.

A computer or computer system, such as those described herein, includes at least one processor or processing unit and a system memory. The computer or computer system typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary non-transitory computer-executable components for use in the processes described above include, but are not limited to only including, a display component that causes the processor 302 (shown in FIG. 5) to present a work center calendar 110 on a display device 318 (shown in FIG. 5). The components also include an interface component that causes the processor 302 to receive user inputs via, for example, the I/O interface 328 (shown in FIG. 5). As described above, the user inputs may be related to use of tool 100 to validly schedule/reschedule work tasks 112, 118 and resources 120 (shown in FIGS. 2A-4C), and/or to view the calendar 110 schedule in a time progression along a horizontally oriented viewing pattern.

Moreover, the components include a scheduling engine 130 component that causes the processor 302 to automatically reschedule work tasks 112 and maintain a logically correct schedule for calendar 110. In some embodiments, the scheduling engine 130 component causes the processor 302 to execute a linear rescheduling of work tasks 112 based on tasks duration and valid work dates/times, such as in the process described above.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

For example, the above illustrates a viewing pattern with horizontal orientation of work center calendar 110. It is understood that a vertical orientation and corresponding vertical sense of viewing (viewing pattern) of the work center calendar is suitable for other embodiments.

What is claimed is:

1. A computer-implemented method for providing an automatic visual scheduler comprising:
   using a digital processor:
   providing an electronic calendar that displays scheduled tasks in a time progression and in time order of respective task start date and times, wherein the electronic calendar is displayed by the digital processor;
   providing a graphical user interface to the electronic calendar that employs drag and drop technology; and
   in response to user interaction with the electronic calendar as displayed by the digital processor, automatically: (i) scheduling a user requested unscheduled task and rescheduling any affected previously scheduled tasks and associated resources in the calendar, and (ii) assigning a user requested resource to execute the user requested scheduled task, the assigning automatically determining availability of the assigned user requested resource during date and times of the user requested scheduled task,
   such that the calendar maintains a logically correct schedule of resources and tasks including the user-requested task and the previously scheduled tasks, wherein the user interaction includes:
   dragging and dropping a visual representation of the user requested unscheduled task into the calendar at a certain date and time, wherein the digital processor displays the dragged and dropped visual representation in the calendar at the certain date and time as the user requested scheduled task, and
   dragging and dropping a working visual indication of the user requested resource onto the displayed visual representation of the user requested scheduled task in the calendar, in response to the dragging and dropping of the working visual indication of the user requested resource, the digital processor automatically determines if the user requested resource is available during the certain date and time of the user requested scheduled task, and if available, automatically displaying the dragged and dropped working visual indication in the calendar as the assigned user requested resource.

2. The computer-implemented method as claimed in claim 1 wherein the electronic calendar displays scheduled tasks in time order of respective start date and times such that increasing date and time of the time progression is illustrated in a same direction as increasing date and time of viewing pattern of the electronic calendar.

3. The computer-implemented method as claimed in claim 2 wherein the direction of increasing date and time is left to right.

4. The computer-implemented method as claimed in claim 1 wherein the graphical user interface to the electronic calendar implements a horizontally oriented viewing pattern by progressing views of the calendar from one side to an opposite side of a display screen to display scheduled tasks and associated dates or times into the future relative to currently displayed dates and times, and vice versa to display scheduled tasks and associated dates and times backward in time.

5. The computer-implemented method as claimed in claim 4 wherein the user interaction includes dragging and dropping a task into a date and time position in the electronic calendar.

6. The computer-implemented method as claimed in claim 1 further comprising:
   in response to user interaction with a user-selected scheduled task displayed in the electronic calendar, automatically rescheduling the user-selected task to a user requested date and time, and automatically rescheduling any impacted other scheduled tasks in the calendar.

7. The computer-implemented method as claimed in claim 6 wherein the automatically rescheduling of any impacted other scheduled tasks employs linear rescheduling.

8. The computer-implemented method as claimed in claim 1 wherein the rescheduling of any affected previously scheduled tasks is a linear rescheduling based on duration of each scheduled task and availability of valid work date-times for tasks.

9. The computer-implemented method as claimed in claim 1 wherein the scheduled tasks are work tasks of at least one of shop order operations and manufacturing production.

10. The computer-implemented method as claimed in claim 1 wherein automatically determining the availability of the assigned user requested resource includes determining whether the assigned user requested resource is scheduled to execute another task during the date and times of the user requested scheduled task.

11. A computer system for providing an automatic visual scheduler, the computer system comprising:
    a digital processor and associated memory coupled to provide at least one electronic calendar that displays scheduled tasks in a time progression oriented so as to have a viewing pattern that is synonymous with sense of time, and the electronic calendar displays scheduled tasks in time order of respective start date and times;
    a graphical user interface executed by the digital processor and operatively coupled to the electronic calendar, the graphical user interface configured to employ drag and drop technology; and
    a scheduling engine executed by the digital processor and operatively coupled to the graphical user interface, the scheduling engine-responsive to user interaction with the electronic calendar as displayed by the digital processor and automatically: (i) scheduling a user requested unscheduled task and rescheduling any affected previously scheduled tasks and associated resources in the electronic calendar, and (ii) assigning a user requested resource to execute the user requested scheduled task, the assigning automatically determining availability of the assigned user requested resource during date and times of the user requested scheduled task, such that the calendar maintains a logically correct schedule of resources and tasks including the user-requested task and the previously scheduled tasks, wherein the user interaction includes:

dragging and dropping a visual representation of the user requested unscheduled task into the electronic calendar at a certain date and time via the graphical user interface, wherein the scheduling engine displays the dragged and dropped visual representation in the calendar at the certain date and time as the user requested scheduled task, and dragging and dropping a working visual indication of the user requested resource onto the displayed visual representation of the user requested scheduled task in the calendar, in response to the dragging and dropping of the working visual indication of the user requested resource, the scheduling engine automatically determines if the user requested resource is available during the certain date and time of the user requested scheduled task, and if available, automatically displaying the dragged and dropped working visual indication in the calendar as the assigned user requested resource;

wherein the digital processor displays views of the electronic calendar on a display monitor communicatively coupled to the digital processor.

12. The computer system as claimed in claim 11 wherein increasing date and time of the time progression is illustrated in a same direction as increasing date and time of the viewing pattern.

13. The computer system as claimed in claim 12 wherein the direction of increasing date and time is left to right.

14. The computer system as claimed in claim 11 further comprising a graphical user interface coupled to the electronic calendar and implementing a horizontally oriented viewing pattern by progressing views of the calendar from one side of the display monitor to an opposite side to display scheduled tasks at dates and times into the future relative to currently displayed dates and times, and vice versa to display scheduled tasks at dates and times backwards in time.

15. The computer system as claimed in claim 14 wherein the user interaction includes dragging and dropping a task into a date and time position in the electronic calendar.

16. The computer system as claimed in claim 11 wherein the scheduling engine is further configured to, in response to user interaction with a user-selected scheduled task displayed in the electronic calendar, automatically reschedule the user-selected task to a user requested date and time, and automatically reschedule any impacted other scheduled tasks in the calendar.

17. The computer system as claimed in claim 11 wherein the scheduling engine employs linear rescheduling.

18. The computer system as claimed in claim 11 wherein the scheduled tasks are work tasks of at least one of shop order operations, and manufacturing production.

19. The computer system as claimed in claim 11 wherein automatically determining the availability of the assigned user requested resource includes determining whether the assigned user requested resource is scheduled to execute another task during the date and times of the user requested scheduled task.

20. A computer program product comprising: a non-transitory computer readable medium holding computer code instructions thereon, the computer code instructions, when executed by at least one processor, cause an automatic visual scheduler to:

provide one or more electronic calendars and support user manipulation of any of the electronic calendars;

display scheduled tasks in the electronic calendar, said display being in a time progression along a horizontally oriented viewing pattern;

provide a graphical user interface to the electronic calendar that employs drag and drop technology; and in response to user interaction with the electronic calendar, automatically: (i) schedule a user requested task and reschedule any impacted previously scheduled tasks and associated resources in the electronic calendar, and (ii) assign a user requested resource to execute the user requested scheduled task, the assigning automatically determining availability of the assigned user requested resource during date and times of the user requested scheduled task such that the electronic calendar maintains a logically correct schedule of resources and tasks including the user-selected task and the previously scheduled tasks, wherein the user interaction includes:

dragging and dropping a visual representation of the user requested unscheduled task into the calendar at a certain date and time, wherein the at least one processor displays the dragged and dropped visual representation in the calendar at the certain date and time as the user requested scheduled task, and dragging and dropping a working visual indication of the user requested resource onto the displayed visual representation of the user requested scheduled task in the calendar, in response to the dragging and dropping of the working visual indication of the user requested resource, the at least one processor automatically determines if the user requested resource is available during the certain date and time of the user requested scheduled task, and if available, automatically displaying the dragged and dropped working visual indication in the calendar as the assigned user requested resource.

* * * * *